(12) United States Patent
Huang et al.

(10) Patent No.: US 7,608,955 B2
(45) Date of Patent: Oct. 27, 2009

(54) MOTOR

(75) Inventors: Wen-Shi Huang, Taoyuan Hsien (TW);
Chin-Chu Hsu, Taoyuan Hsien (TW);
Chun-Hua Yang, Taoyuan Hsien (TW);
Chia-Ying Hsu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/958,174

(22) Filed: Dec. 17, 2007

(65) Prior Publication Data
US 2008/0157614 A1   Jul. 3, 2008

(30) Foreign Application Priority Data
Jan. 2, 2007   (TW) .............................. 96100028 A (51) Int. Cl.
*H02K 5/00*   (2006.01)
(52) U.S. Cl. ....................................................... 310/89
(58) Field of Classification Search .................... 310/89, 310/49 R
See application file for complete search history.

(56) References Cited

U.S. PATENT DOCUMENTS

| | | | | |
|---|---|---|---|---|
| 3,931,834 | A * | 1/1976 | Caillet | 138/30 |
| 6,849,973 | B2 * | 2/2005 | Kurosawa et al. | 310/49 R |
| 7,375,446 | B2 * | 5/2008 | Suzuki et al. | 310/86 |
| 2004/0051404 | A1 * | 3/2004 | Kurosawa et al. | 310/49 R |
| 2008/0299881 | A1 * | 12/2008 | Herbin et al. | 451/390 |

* cited by examiner

*Primary Examiner*—Nguyen N Hanh
(74) *Attorney, Agent, or Firm*—Birch, Stewart, Kolasch & Birch, LLP (57) ABSTRACT

A motor includes a first housing, a second housing, a rotor and a stator. The second housing is assembled with the first housing to form an accommodating space. The second housing has a flange adjacent to the connection between the first and second housings. The rotor has a shaft extended outwardly from the second housing and disposed in the accommodating space. The stator is disposed corresponding to the rotor and in the accommodating space. The flange has at least one protruding portion. When the second housing is assembled with the first housing, the protruding portion presses against the stator and is deformed so that the first and second housings are sealed.

14 Claims, 8 Drawing Sheets

MOTOR

CROSS REFERENCE TO RELATED APPLICATIONS

This Non-provisional application claims priority under 35 U.S.C. §119(a) on Patent Application No(s). 096100028 filed in Taiwan, Republic of China on Jan. 2, 2007, the entire contents of which are hereby incorporated by reference.

BACKGROUND OF THE INVENTION

1. Field of Invention

The invention relates to a motor and, in particular, to a stepping motor with the design of tolerating assembly gaps.

2. Related Art

The rigidity of motor structure has an important influence on the vibrations, noises, and lifetime of the motor. This is because the motor components always have some tolerances in batch productions. If the tolerances are not carefully taken care of, the internal components of the motor may become loose and affect the precision, output stability, as well as lifetime of the motor.

Figure 1A:
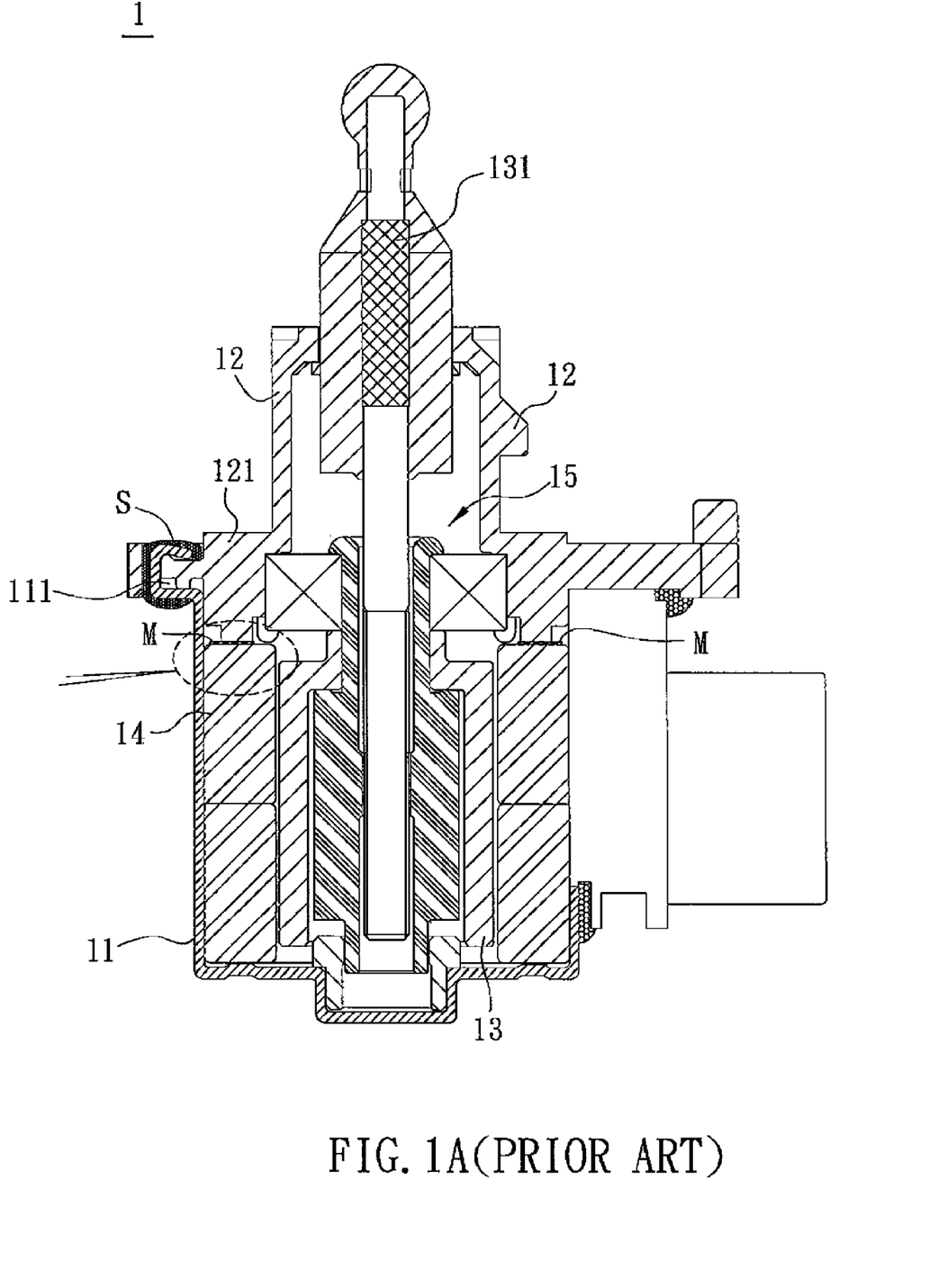
FIG. 1A is a schematic view of the conventional motor.
Figure 1B:
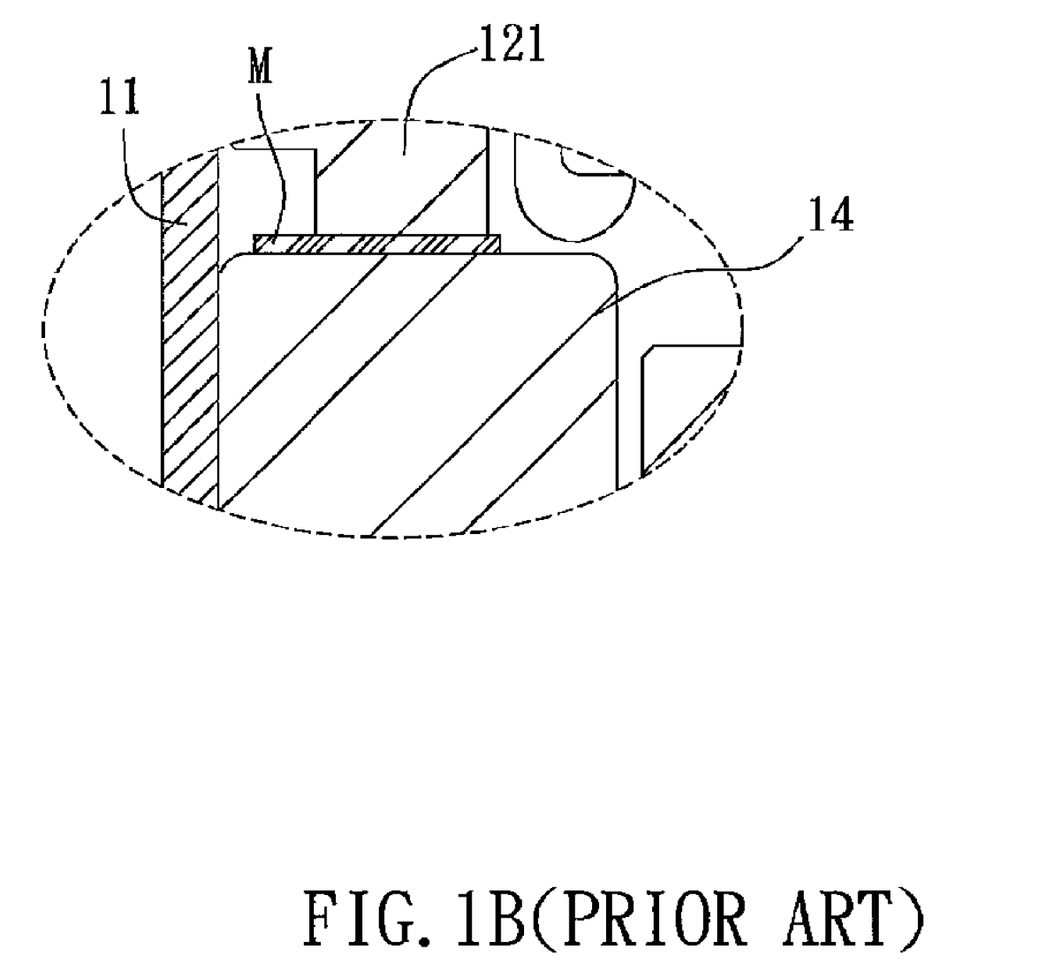
FIG. 1B is a partially enlarged view of FIG. 1A.

To solve this problem, as shown in FIG. 1A, a conventional motor 1 includes a lower housing 11, an upper housing 12, a rotor 13 and a stator 14. The lower housing 11 has a concave portion 111, and the upper housing 12 has a flange 121 disposed corresponding to the concave portion 111. The upper housing 12 and the lower housing 11 together form an accommodating space 15 for accommodating the rotor 13 and the stator 14. The rotor 13 is disposed corresponding to the stator 14 and has a shaft 131 protruding from the upper housing 12. FIG. 1B is a partially enlarged view of FIG. 1A. As shown in FIG. 1B, when the lower housing 11 and the upper housing 12 are assembled, the flange 121 of the upper housing 12 touches against the concave portion 111 of the lower housing 11 and the upper end surface of the stator 14. The motor tolerates the gap between the flange 121 and the stator 14 due to their tolerances using a gap-tolerating material M between the flange 121 and the upper end surface of the stator 14. Finally, a sealing material S seals the connection between the flange 121 and the concave portion 111. This completes the assembly of the motor 1, and prevents dusts or impurities from entering the motor 1.

However, when a gap-tolerating material M is used to tolerate assembly gaps, it is necessary to consider the motor housing structure. Different motor housing structures require the use of different materials, such as rubber, silicone, plastic or iron sheets. Other factors such as shape and thickness should be considered as well. All these inevitably increase the assembly difficulty and costs.

Therefore, it is an important subject to provide a motor that can tolerate component gaps and ensure good sealing, thereby increasing the reliability and lifetime of the motor, as well as reducing assembly steps and material costs.

SUMMARY OF THE INVENTION

In view of the foregoing, the invention is to provide a motor that can tolerate component gaps and ensure good sealing. The invention can increase the reliability and lifetime of the motor, as well as reduce assembly steps and material costs.

To achieve the above, the invention discloses a motor including a first housing, a second housing, a rotor and a stator. The second housing is assembled with the first housing to form an accommodating space. The second housing has a flange adjacent to a connection between the first and second housings, and the flange has at least one protruding portion. The rotor has a shaft protruding from the second housing and is disposed in the accommodating space. The stator is disposed corresponding to the rotor and in the accommodating space. When the first and second housings are assembled, the protruding portion presses against the stator and is deformed by the first housing so that the first and second housings are sealed.

As mentioned above, the motor of the invention has a flange disposed adjacent to the connection between the first and second housings. At least one protruding portion is formed on the flange so that, when the housings are assembled, the protruding portion presses against the stator and is deformed in such a way that the housings are tightly sealed. Compared with the related art, the invention does not require the use of any additional gap-tolerating material. The structural design at the housing connection of the invention can eliminate assembly gaps, ensuring good sealing for the motor. Thus, dusts or impurities are prevented from entering the motor. This improves the precision, output stability, and thus reliability and lifetime of the motor.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2A:
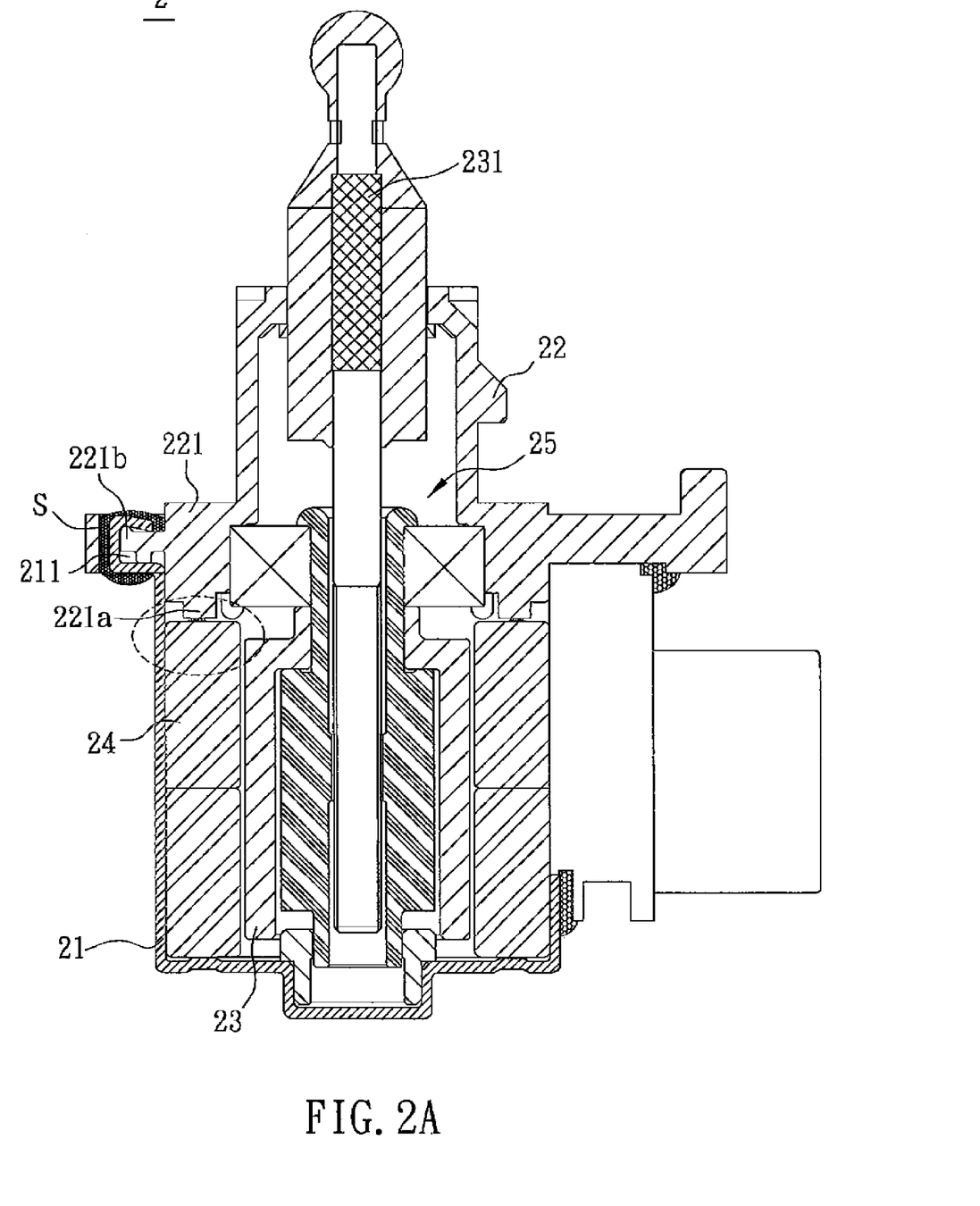
FIG. 2A is a schematic view of a motor according to an embodiment of the invention.

With reference to FIG. 2A, a motor 2 according to an embodiment of the invention includes a first housing 21, a second housing 22, a rotor 23 and a stator 24. The motor 2 is a stepping motor used, for example, on a vehicle. The second housing 22 of the motor 2 is assembled with the first housing 21 to form an accommodating space 25. The stator 24 and the rotor 23 are both disposed inside the accommodating space 25 and corresponding to each other. The rotor 23 has a shaft 231 extended outwardly from the second housing 22. The first housing 21 of the motor 2 is made of a conductive and rigid metal, such as iron or alloys thereof, to ensure the structural rigidity thereof.

Figure 2B:
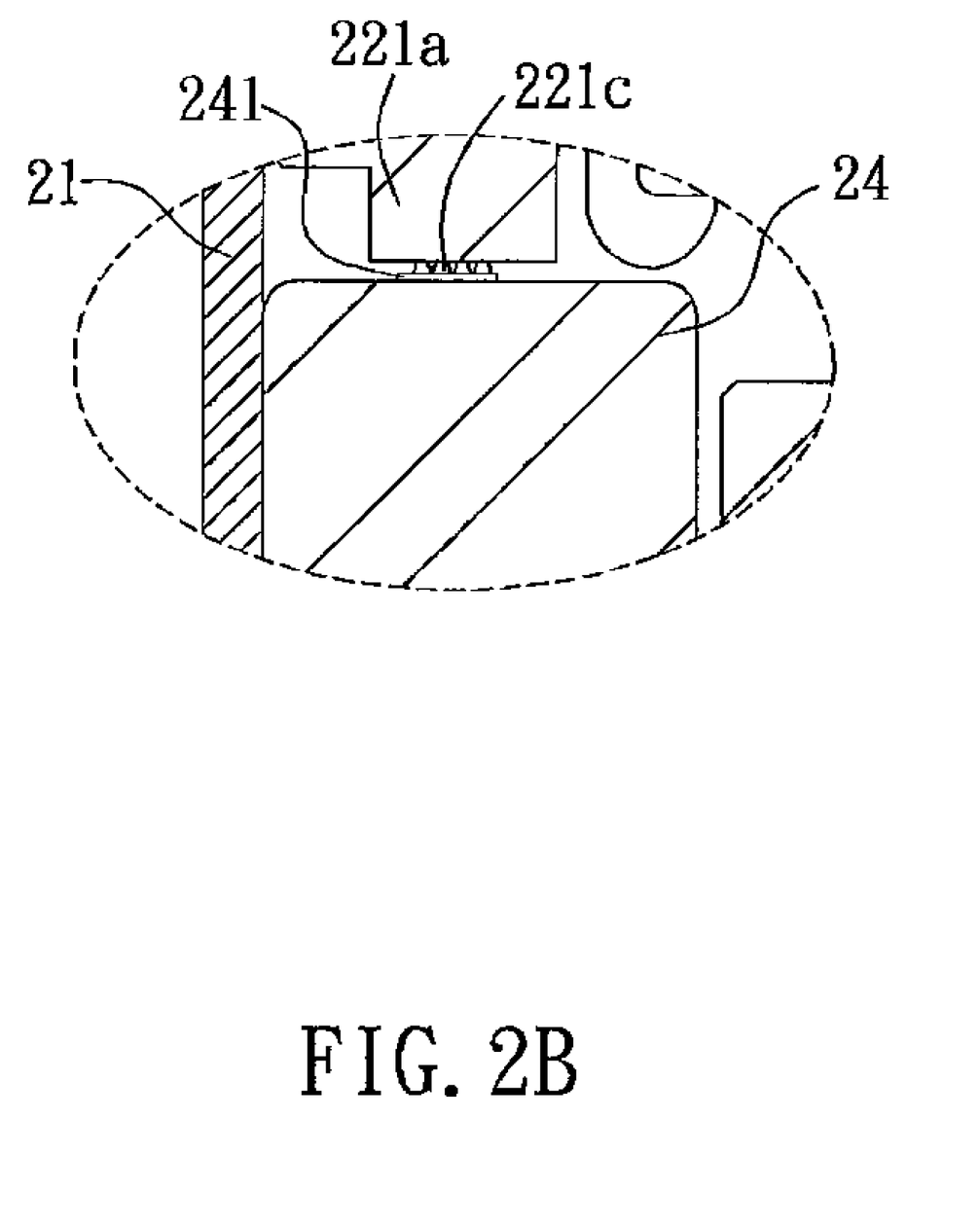
FIG. 2B is a partially enlarged view of FIG. 2A.

With reference to FIGS. 2A and 2B, the second housing 22 has a flange 221 disposed adjacent to the connection between the first and second housings 21, 22. The flange 221 has a first end 221a and a second end 221b. The first housing 21 has a concave portion 211 corresponding to the second end 221b for accommodating it. The flange 221 has at least one protruding portion 221c. The stator 24 has at least one convex portion 241 corresponding to the protruding portion 221c.

When the first and second housings 21, 22 are assembled, the protruding portion 221c presses against the convex portion 241 to be deformed. Therefore, the assembly gaps between the first and second housings 21, 22 can be tolerated and a fight seal therebetween can be formed. At the connection between the first and second housing 21, 22, the second end 221b corresponds to and accommodates the concave portion 211. A silicon-containing sealing material S is used to seal the connection of the first and second housings 21, 22 so that the assembly of the motor 2 can be completed.

Figure 3A:
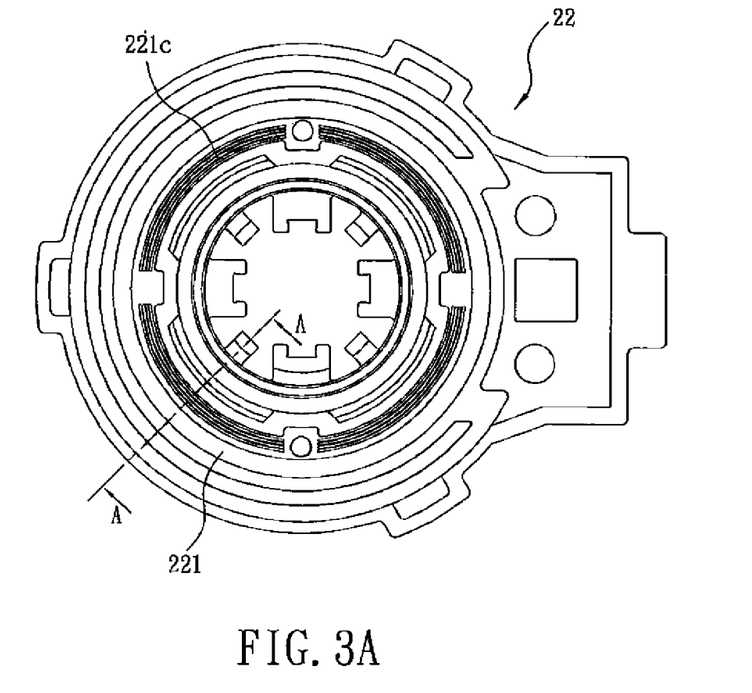
FIGS. 3A and 3B are a bottom view of a second housing and a top view of a first housing, respectively.
Figure 3B:
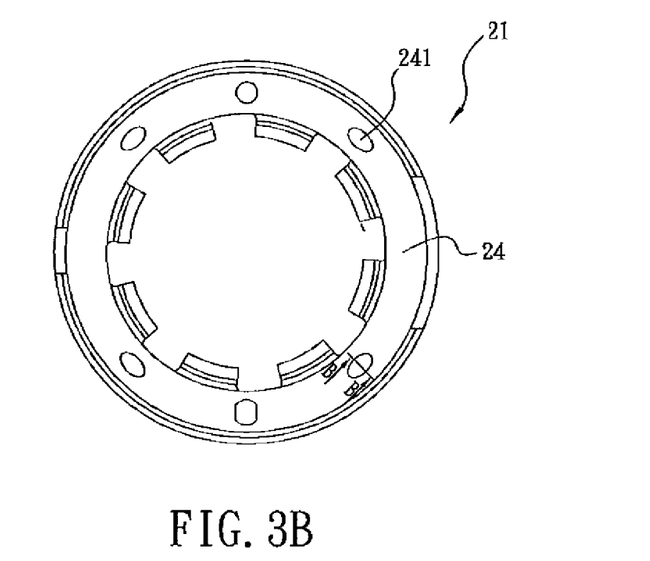

FIGS. 3A and 3B are the bottom view of the second housing 22 and the top view of the first housing 21, respectively. As shown in FIG. 3A, the second housing 22 includes the flange 221 and the protruding portions 221c disposed on the flange 221. As shown in FIG. 3B, the first housing 21 includes the stator 24 and the convex portions 241 corresponding to the protruding portion 221c of the second housing 22. In the embodiment, the shapes of the protruding portions 221c are regularly distributed stripes with a width of about 5 mm. In practice, the shapes or areas of the protruding portions and convex portions can be the same or different. Their shapes can be regular or irregular. For example, each of the protruding portions and convex portions may have a point-like, stripe-like, or block-like shape. The point-like shape can be circular, elliptical, rectangular or polygonal.

Figure 4A:
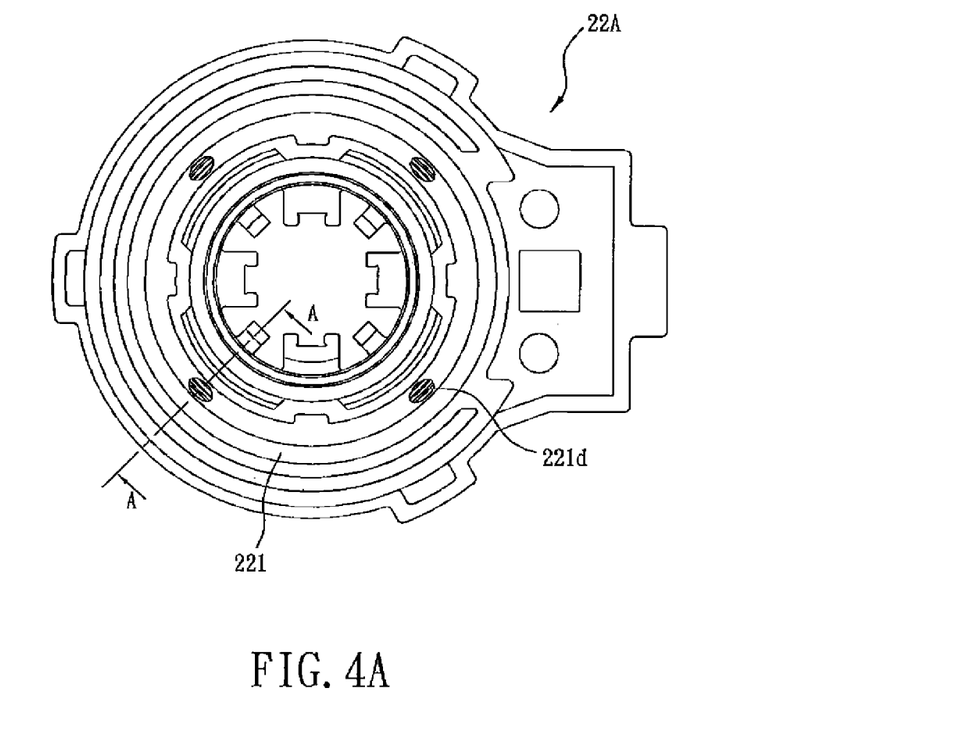
FIGS. 4A and 4B respectively show a bottom view of a second housing and a top view of a first housing of a motor according to another embodiment of the invention.
Figure 4B:
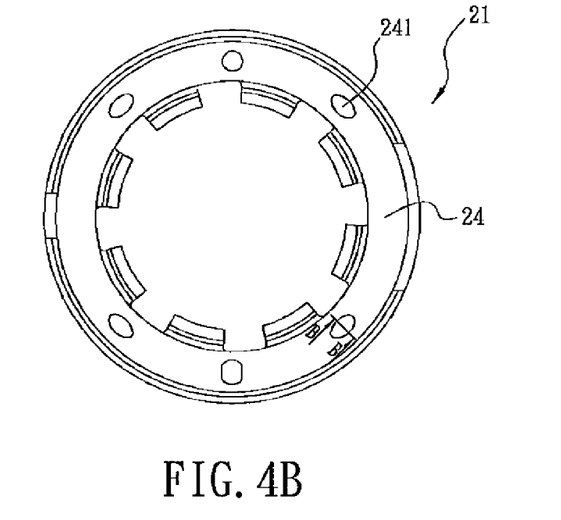

FIGS. 4A and 4B show the bottom view of another second housing 22A and the top view of the first housing 21, respectively. As shown in FIG. 4A, the difference between the protruding portions 211d of the second housing 22A and the protruding portions 211c is that: the protruding portions 221d of the second housing 22A have a regular point-like distribution and have an elliptical shape corresponding to the convex portions 241 of the first housing 21 so that a good sealing effect can be achieved.

Figure 5A:
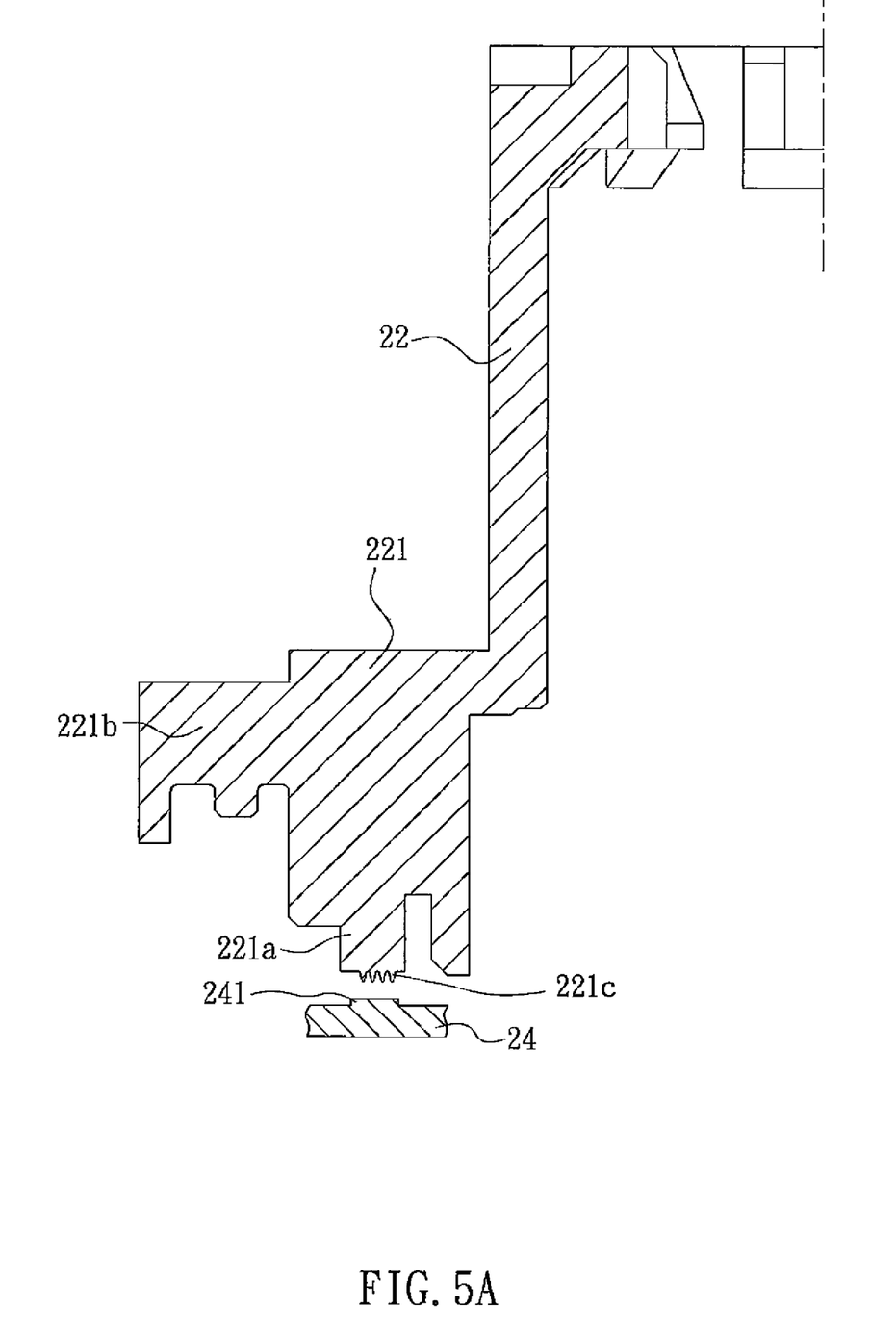
FIG. 5A is a cross-sectional view of a second housing along a line A-A and a stator along a line B-B of FIG. 3A.

FIG. 5A is a cross-sectional view of the second housing 22 along the line A-A and the stator 24 along the line B-B in FIG. 3A. The second housing 22 has a flange 221, a first end 221a and a second end 221b. In the embodiment, the protruding portion 221c on the first end 221a has several regular and continuous protrusions. The protrusions of the protruding portion 221c corresponding to the convex portions 241 of the stator 24 can be deformed to seal the motor.

Figure 5B:
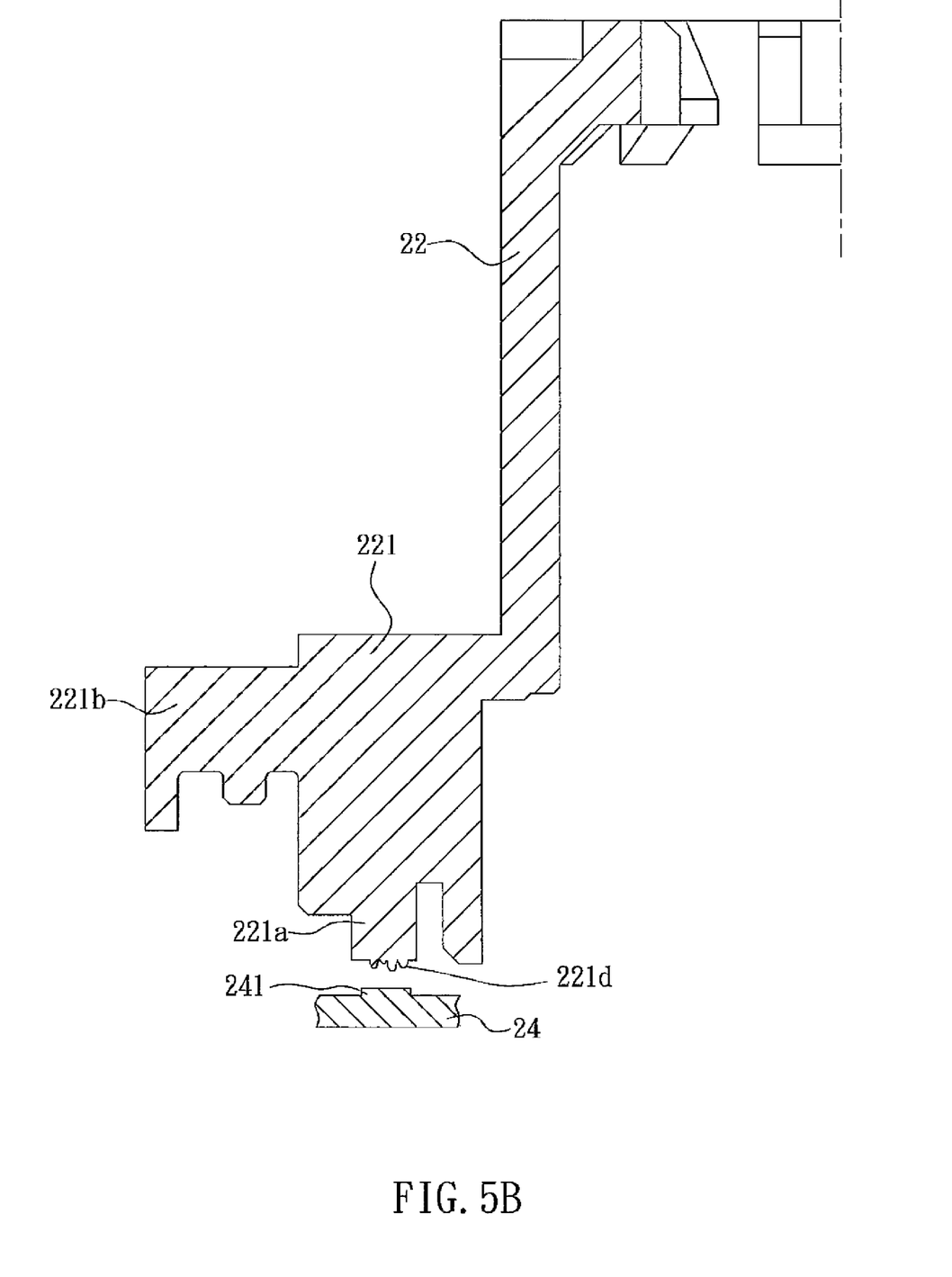
FIG. 5B is a cross-sectional view of a second housing along a line A-A and a stator along a line B-B of FIG. 4A.

FIG. 5B is a cross-sectional view of the second housing 22A along the line A-A and the stator 24 along the line B-B in FIG. 4A. The protruding portions 221d on the first end 221a have discontinuous protrusions of irregular shapes. The shapes of the corresponding convex portions 241 on the stator 24 are the same so that the first housing 21 and the second housing 22 can be tightly sealed.

In summary, the motor of the invention has a flange disposed adjacent to the connection between the first housing and the second housing. At least one protruding portion is formed on the flange so that, when the housings are assembled, the protruding portion presses against the stator and deforms in such a way that the housings are tightly sealed. Compared with the related art, the invention does not require the use of any additional gap-tolerating material. The structural design at the housing connection of the invention can eliminate assembly gaps, ensuring good sealing for the motor. Thus, dusts or impurities are prevented from entering the motor. This improves the precision, output stability, and thus reliability and lifetime of the motor.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A motor comprising:
   a first housing;
   a second housing assembled with the first housing to form an accommodating space, wherein the second housing has a flange adjacent to a connection between the first housing and the second housing, and the flange has at least one protruding portion;
   a rotor disposed in the accommodating space and having a shaft extended outwardly from the second housing; and
   a stator disposed in the accommodating space and corresponding to the rotor;
   wherein when the first housing and the second housing are assembled, the protruding portion presses against the stator and is deformed so that the first housing and the second housing are sealed.

2. The motor of claim 1, wherein the protruding portion has a plurality of protrusions in regular or irregular shapes.

3. The motor of claim 2, wherein the protrusions are configured continuously or discontinuously.

4. The motor of claim 1, wherein the stator has at least one convex portion corresponding to the protruding portion.

5. The motor of claim 4, wherein shapes or areas of the protruding portion and the convex portion are the same or different.

6. The motor of claim 5, wherein the shapes of the protruding portion and the convex portion are regular or irregular.

7. The motor of claim 5, wherein each of the protruding portion and the convex portion has a point-like, stripe-like, or block-like shape.

8. The motor of claim 7, wherein the point-like shape is circular, elliptical, rectangular, or polygonal.

9. The motor of claim 1, wherein the first housing is made of a rigid material.

10. The motor of claim 1, wherein the first housing is made of a conductive material.

11. The motor of claim 10, wherein the conductive material is metal or alloy.

12. The motor of claim 1, wherein the connection between the first housing and the second housing is covered by a sealing material.

13. The motor of claim 12, wherein the sealing material is a silicon-containing material.

14. The motor of claim 1, wherein the motor is a stepping motor.

* * * * *